Sept. 23, 1952   B. R. WINBORN, JR., ET AL   2,611,505
PRESSURE TANK COVER CONSTRUCTION
Filed March 26, 1948   3 Sheets-Sheet 1
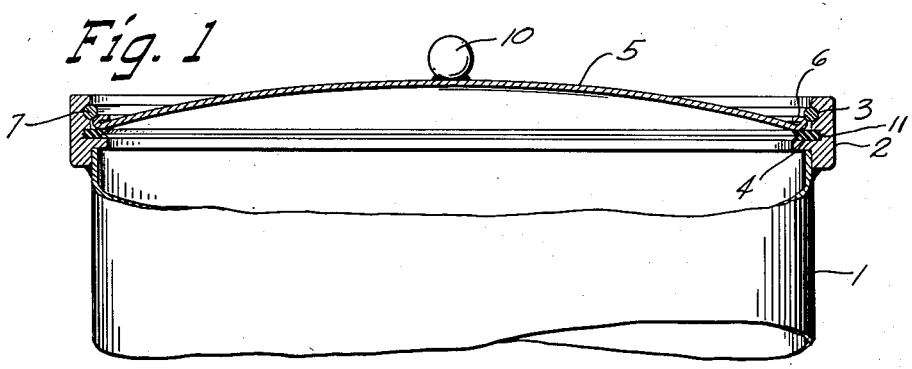
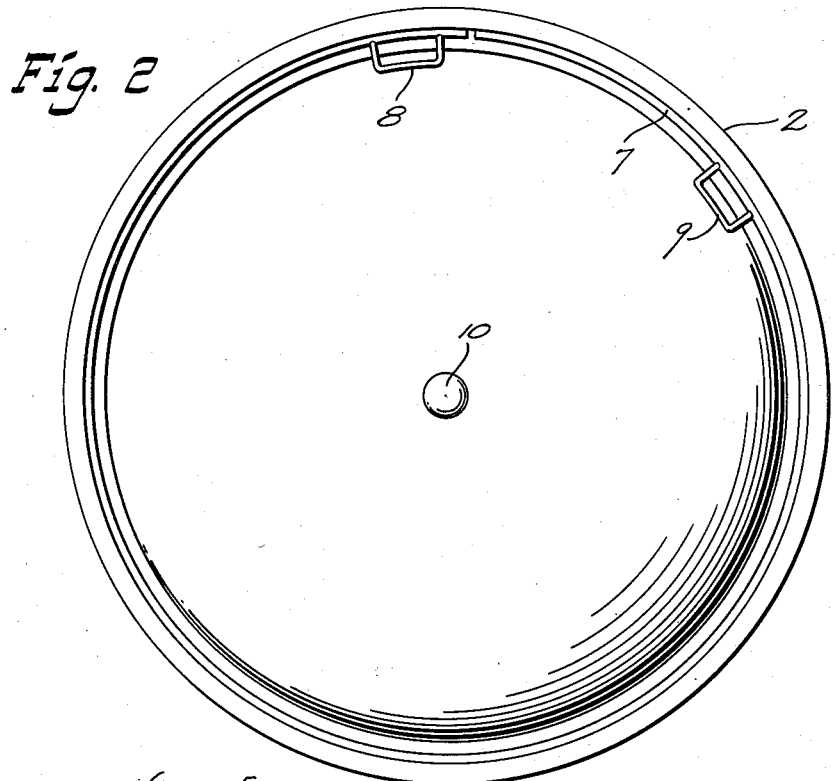
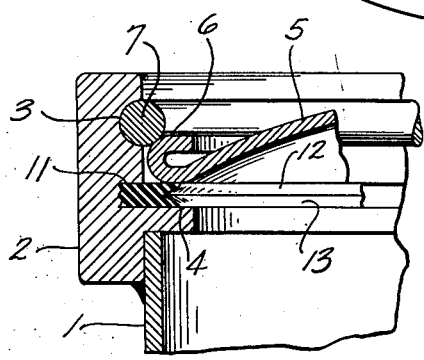
INVENTORS.
Byron R. Winborn Jr.
Daniel E. Beduhn
BY
Arthur R. Woolfolk
Attorney

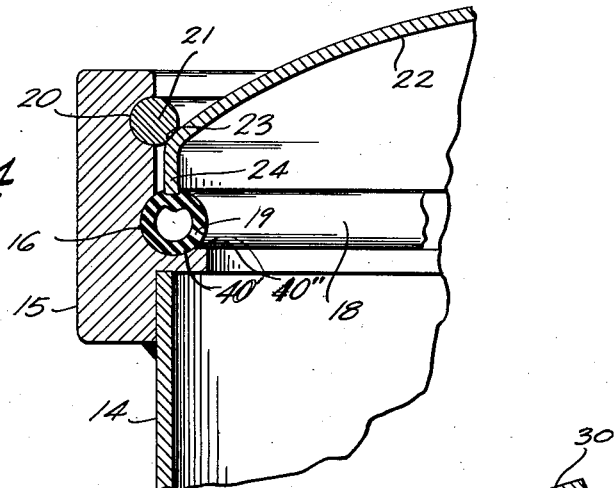
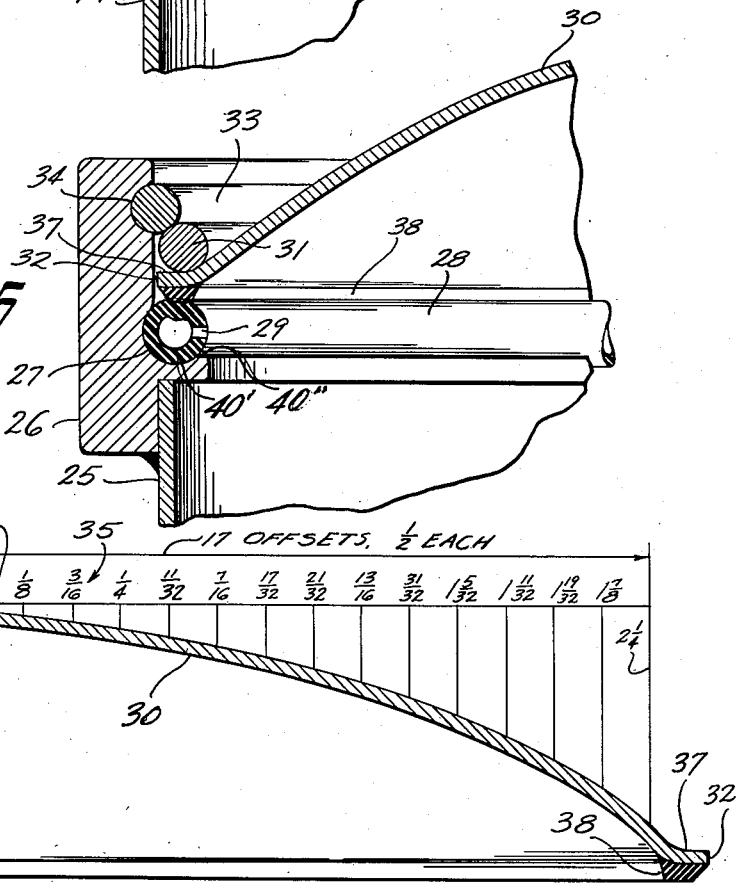

Sept. 23, 1952  B. R. WINBORN, JR., ET AL  2,611,505
PRESSURE TANK COVER CONSTRUCTION
Filed March 26, 1948  3 Sheets-Sheet 3
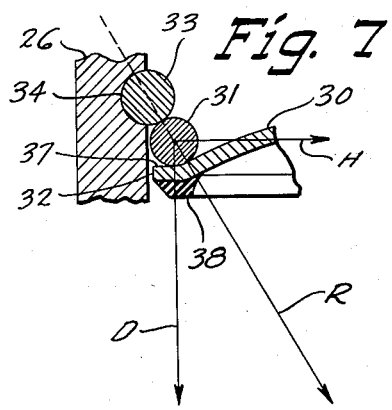
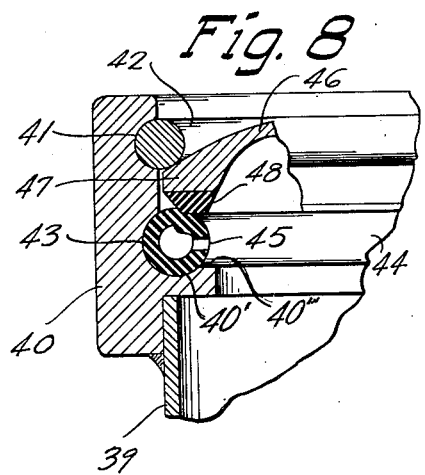
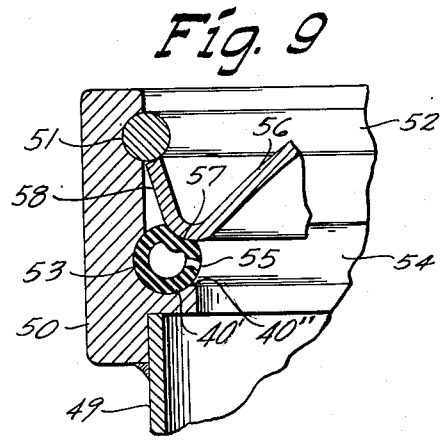
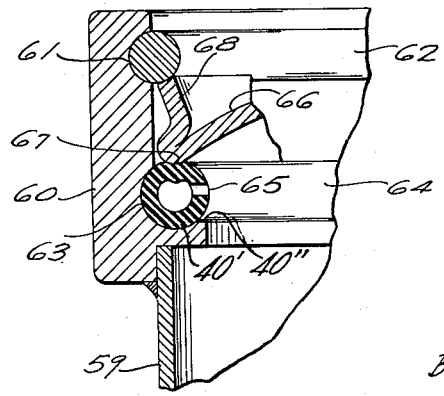
INVENTORS.
Byron R. Winborn Jr.
Daniel E. Beduhn
BY
Arthur R. Woolfolk
Attorney Patented Sept. 23, 1952

2,611,505

UNITED STATES PATENT OFFICE 2,611,505

PRESSURE TANK COVER CONSTRUCTION

Byron R. Winborn, Jr., and Daniel E. Beduhn, Manitowoc, Wis., assignors to Manitowoc Shipbuilding Company, Manitowoc, Wis.

Application March 26, 1948, Serial No. 17,267

2 Claims. (Cl. 220—46)

This invention relates to a pressure tank cover construction.

In pressure tanks such as the filter tanks in dry cleaning equipment it has been found difficult to keep the cover tightly clamped to the tank when pressure was internally applied. In addition to this, the covers were very heavy and were difficult to position and remove and were also difficult to clamp in place against the gasket. Further than this, the operation of either positioning and clamping the cover or loosening the clamps and removing the cover consumed a considerable amount of time.

This invention is designed to overcome the above noted defects and objects of this invention are to provide a cover which is very strong but nevertheless which is of light weight and may be quickly applied to or removed from the tank, and to provide locking means for the cover coacting therewith in such a manner that the locking means may be substantially instantly applied or removed, thus allowing the light weight cover to be readily lifted from or positioned on the tank.

A specific object of this invention is to provide a circular cover construction in which the cover is dished so that on a section from the center to the periphery of the cover the radius of curvature gradually increases as the marginal edge of the cover is approached.

It has been found that with this shaped or dished cover, that although a slight amount of bowing occurs when the pressure inside the tank is raised, that the cover does not blow off. It is, therefore, a further object of this invention to provide a tank cover which though of light weight will not blow off.

Further objects, for certain forms of the invention, are to so construct the cover and the cooperating parts, that when the pressure builds up in the tank the major portion of the radial thrust tending to produce a compressing force is not transmitted directly to that portion of the cover subjected to maximum bending forces, but is borne either by a reinforced portion or by a separate member thus lessening the maximum fiber stress per unit area for the portion of the cover adjacent its periphery.

A further specific object of this invention is to provide a cover construction for a tank in which the locking means is more firmly forced into locking engagement with the collar of the tank as pressure is applied internally of the tank.

Embodiments of the invention are shown in the accompanying drawings, in which—

Figure 1 is a fragmentary side elevation partly in section of a pressure tank with the cover in place.

Figure 2 is a plan view of the structure shown in Figure 1.

Figure 3 is an enlarged sectional detail of the structure shown in Figure 1.

Figures 4 and 5 are views corresponding to Figure 3 showing modified forms of the invention.

Figure 6 is a fragmentary sectional view through the cover shown in Figure 5 showing by dimensions the amount of curvature of the upwardly dished cover.

Figure 7 is a force diagram for the structure shown in Figure 5.

Figures 8, 9 and 10 are fragmentary views showing further forms of the invention.

Referring to the drawings, Figures 1 through 3, it will be seen that a cylindrical pressure tank 1 has been illustrated, such for instance as the filter tank in a dry cleaning system. This cylindrical tank has an upper collar 2 secured thereto and provided with an annular groove 3 located internally of the tank and with a downwardly spaced annular shoulder 4. The cover 5 is formed of sheet metal and is upwardly dished and is relatively light, though very strong. Its marginal edge portions are rounded by turning them inwardly as indicated at 6 and these rounded portions constitute pressure transmitting portions which are in engagement with a locking resilient split ring 7. The split ring 7 is provided with a pair of inwardly and upwardly extending handle portions 8 and 9. One of the handle portions, 8 for instance, is located closely adjacent one end of the ring. A handle or knob 10 is provided for the cover.

It is to be noted that the shoulder 4 of the tank is spaced downwardly from the marginal edge of the cover and an annular yielding gasket 11 is clamped between the marginal portion of the cover and the shoulder portion 4 of the tank as shown most clearly in Figure 3. This gasket has spaced upper and lower lips or portions 12 and 13, respectively, and these portions are adapted to separate slightly when pressure builds up within the tank, thus increasing the sealing effect of the gasket 11 against both the shoulder 4 of the ring and the cover 5.

It is to be noted, particularly from reference to Figure 3, that the contacting portions of the cover 5 and locking ring 7 are rounded and that the line of pressure is normal to both surfaces and extends outwardly and upwardly through the center of the locking ring 7. This, therefore, produces a resultant force which urges the ring 7 outwardly into firmer engagement with the annular groove 3 of the tank as the pressure in the tank builds up. The cover will bow slightly under increasing pressure within the tank, but nevertheless it will still maintain the line of pressure between the locking ring 7 and the pressure transmitting rounded portion 6 of the cover along a line passing upwardly and outwardly through the locking ring 7 and thus the cover will not blow off.

Referring to Figure 4, it will be seen that the tank 14 is provided with an upper collar 15 which has an annular groove 16 for the reception of an annular tubular gasket 18. The tubular gasket 18 is provided with one or more openings 19 which places its interior in communication with the interior of the tank. The collar 15 is provided with an annular groove 20 which is arranged to receive the split resilient locking ring 21 similar to the split ring 7 previously described. The cover 22 is upwardly dished and is provided with a rounded pressure transmitting portion 23 bearing against the ring 21. The marginal portion 24 of the cover extends beyond the rounded portion 23 downwardly therefrom and bears against the gasket 18.

When pressure builds up within the tank the coaction between the rounded pressure transmitting portion 23 of the cover and the ring 21 is along a line upwardly and outwardly through the center of the ring, thus increasing the security of engagement of the ring in the annular groove 20.

Referring to Figure 5, the tank 25 is provided with a collar 26 which has an annular groove 27 for the reception of an annular tubular gasket 28. The gasket 28 has one or more apertures 29 placing its interior in communication with the interior of the tank. The cover 30 is upwardly dished in a manner hereinafter to be described, and a continuous annular ring 31, separate and distinct from the cover, is positioned on top of the marginal portion 32 of the cover. The continuous ring 31 bears against the horizontal surface 37 of the marginal portion 32 of the cover. A resilient locking split ring 33, similar to the split ring 7 previously described, seats within an annular groove 34 formed internally of the collar 26 of the tank.

The line of pressure between the rings 31 and 33 passes through the center of the ring 33 and extends upwardly and outwardly, thus increasing the security of the locking of the ring 33 in the groove 34.

The lower face of the marginal portion 32 of the cover has bonded to it a synthetic or other type of yielding annular gasket 38 which thus forms a permanent part of the cover. This gasket 38 protects the lower face of the marginal portion 32 of the cover from becoming nicked or damaged during rough handling. The gasket 38 bears against the gasket 28 when the split ring 33 is in place.

A section of the dished cover 30 of Figure 5 is shown in Figure 6 with dimensions indicated by the reference character 35 showing the amount of downward displacement of the dished cover from a horizontal line 36 passing tangent to the top center portion of the cover. These dimensions are not intended as limiting but are intended to show a highly satisfactory design of cover and to show also, for this form of cover, how a gradual increase in the radius of curvature occurs from the center of the cover to the marginal edge of the cover. In other words, the cover curves more rapidly towards its marginal portion than it does toward its center portion.

Upon reference to the force diagram of Figure 7 a further advantage of the structure shown in Figure 5 will be observed. If the downwardly and inwardly directed force R, passing through the pressure transmitting contacting portions of the rings 31 and 33, is resolved into its horizontal component H and its downward component D, it will be seen that the radially inwardly directed thrust H is borne by the continuous ring 31 and only the downward thrust D is transmitted to the horizontal surface or pressure surface of the marginal lip 32 of the cover 30. In this way the cover is relieved of the radially inwardly directed compressive force D and consequently the fiber stress per unit cross-sectional area of the cover is reduced. The surface 37 of the marginal flange 32 of the cover remains practically horizontal even when the cover is subjected to considerable internal pressure and therefore there is, for all practical purposes, substantially no radial thrust transmitted to the cover.

Referring to Figure 8 it will be seen that the tank 39 is provided with a collar 40 which has the groove 41 for the resilient split locking ring 42 similar to the ring 7 previously described. The collar 40 also has a groove 43 which receives the annular gasket 44, such gasket being tubular and provided with one or more apertures 45. The cover 46 is provided with a thickened marginal portion 47 which has a synthetic, rubber or other yielding gasket 48 bonded to its under side and which gasket is arranged to engage the gasket 44. The cover is arranged to engage the split ring 42 and to bear upwardly against such split ring when pressure exists within the tank. It is to be noted that the thickened marginal portion 47 constitutes a reinforcing portion at the margin of the cover and consequently there is practically no deflectional stresses at this point and most of the compressive stresses are borne by this thickened portion.

Figure 9 shows a further form of the invention in which the tank 49 is provided with a collar 50 having a groove 51 for the reception of the resilient, split locking ring 52, similar to the ring 7 previously described. The collar also has a groove 53 for the reception of an annular, tubular gasket 54 which may have one or more apertures 55 opening thereinto. The cover 56 is provided with a rounded, lower marginal portion 57 which engages the gasket 53 and with an upturned, annular portion 58. The upturned, annular portion receives most of the compressive stresses while the deflectional stresses are borne in the body portion of the cover.

Figure 10 shows a further form of the invention, the tank being indicated by the reference character 59 and the collar by the reference character 60. The collar 60 is provided with a groove 61 for the reception of a split ring 62 similar to the ring 7 previously described. The collar is also provided with a groove 63 for the reception of the annular gasket 64, such gasket being provided with one or more apertures 65. The cover 66 is provided with a doubled portion or rounded, lower portion 67 which bears against the gasket 64 and with an upturned, annular portion 68 which engages the locking split ring 62. Most of the compressive stresses are borne in the portion 68 and most of the deflectional stresses are borne in the body portion of the cover 66.

In the form of the invention shown in Figures 8, 9, and 10, it will be seen that a construction of cover has been provided in each instance in which the portion of the cover which bears the compressive stresses is so arranged that it does not have much of the deflectional stresses imposed thereon.

In the form of the invention shown in Figure 5 it will be seen that a separate and distinct continuous ring 31 independent of the cover is provided which bears the compressive stresses and that the cover is subjected almost entirely to deflectional stresses. In this way the stress per unit area in each form of the constructions shown in Figures 5, 8, 9, and 10 is less per unit area and there is less chance of excessively straining the cover in these forms of the invention.

It will be seen from Figures 4, 5, 8, 9, and 10 that a shoulder 40' is provided against which the gasket is forced when the locking ring is in place and that this shoulder has an upwardly projecting portion 40" located inwardly of the gasket. The portion 40" is effective to prevent the gasket from being forced radially inwardly even if a slight vacuum should be produced in the tank.

The covers forming the subject matter of this invention, though very strong, are nevertheless of light weight and can be easily lifted by the operator from the tank.

Further than this the locking rings may be easily placed in locking position or removed therefrom.

It will be seen that novel forms of cover constructions have been provided by this invention which are simple to make, economical to produce, of light weight, and may be readily handled and quickly and securely locked in place.

It will be seen further that although the covers forming the subject matter of this invention are of light weight, that they nevertheless will maintain a secure seal with the tank and will remain in place even though a considerable pressure is built up within the tank.

Although this invention has been described in considerable detail, it is to be understood that such description is intended as illustrative rather than limiting, as the invention may be variously embodied and is to be interpreted as claimed.

We claim:

1. In a device of the class described, a cylindrical pressure tank having an open top and having an internally located annular groove adjacent its top edge, a circular cover for said tank, a continuous ring circular in cross-section located on the upper side of said cover adjacent the marginal edge of the cover, said tank having a shoulder, a gasket clamped between the marginal edge of said cover and said shoulder, and a split resilient locking ring wholly independent of said continuous ring and seated within said groove and engaging said first mentioned ring, the line of contact between the said rings extending through the center of both rings and outwardly at an angle to the axis of said tank, whereby internal pressure in said tank will increase the security of engagement of said locking ring within said groove.

2. In a device of the class described, a cylindrical pressure tank having an open top and having an internally located annular groove adjacent its top edge, a circular cover for said tank, a continuous ring circular in cross-section located on the upper side of said cover adjacent the marginal edge of the cover, said continuous ring being separate from said cover, said tank having a shoulder, a gasket clamped between the marginal edge of said cover and said shoulder, and a split resilient locking ring wholly independent of said continuous ring and seated within said groove and engaging said first mentioned ring, the line of contact between the said rings extending through the center of both rings and outwardly at an angle to the axis of said tank, whereby internal pressure in said tank will increase the security of engagement of said locking ring within said groove.

BYRON R. WINBORN, JR.
DANIEL E. BEDUHN.

REFERENCES CITED

The following references are of record in the file of this patent:

UNITED STATES PATENTS

| Number | Name | Date |
| --- | --- | --- |
| 212,064 | Spencer | Feb. 4, 1879 |
| 1,286,808 | Shaw | Dec. 3, 1918 |
| 1,303,175 | Draper | May 6, 1919 |
| 1,326,124 | Vischer | Dec. 23, 1919 |
| 1,713,224 | Gunter | May 14, 1929 |
| 1,755,441 | Gunter | Apr. 22, 1930 |
| 2,126,505 | Risser | Aug. 9, 1938 |
| 2,309,617 | Benson | Jan. 26, 1943 |
| 2,387,360 | Smith | Oct. 23, 1945 |

FOREIGN PATENTS

| Number | Country | Date |
| --- | --- | --- |
| 498,619 | Germany | Jan. 29, 1929 |
| 595,332 | France | July 13, 1925 |